C. W. HUMPHREY.
FUEL METER FOR INTERNAL COMBUSTION ENGINES.
APPLICATION FILED FEB. 3, 1920.
1,435,237.
Patented Nov. 14, 1922.
3 SHEETS—SHEET 1.
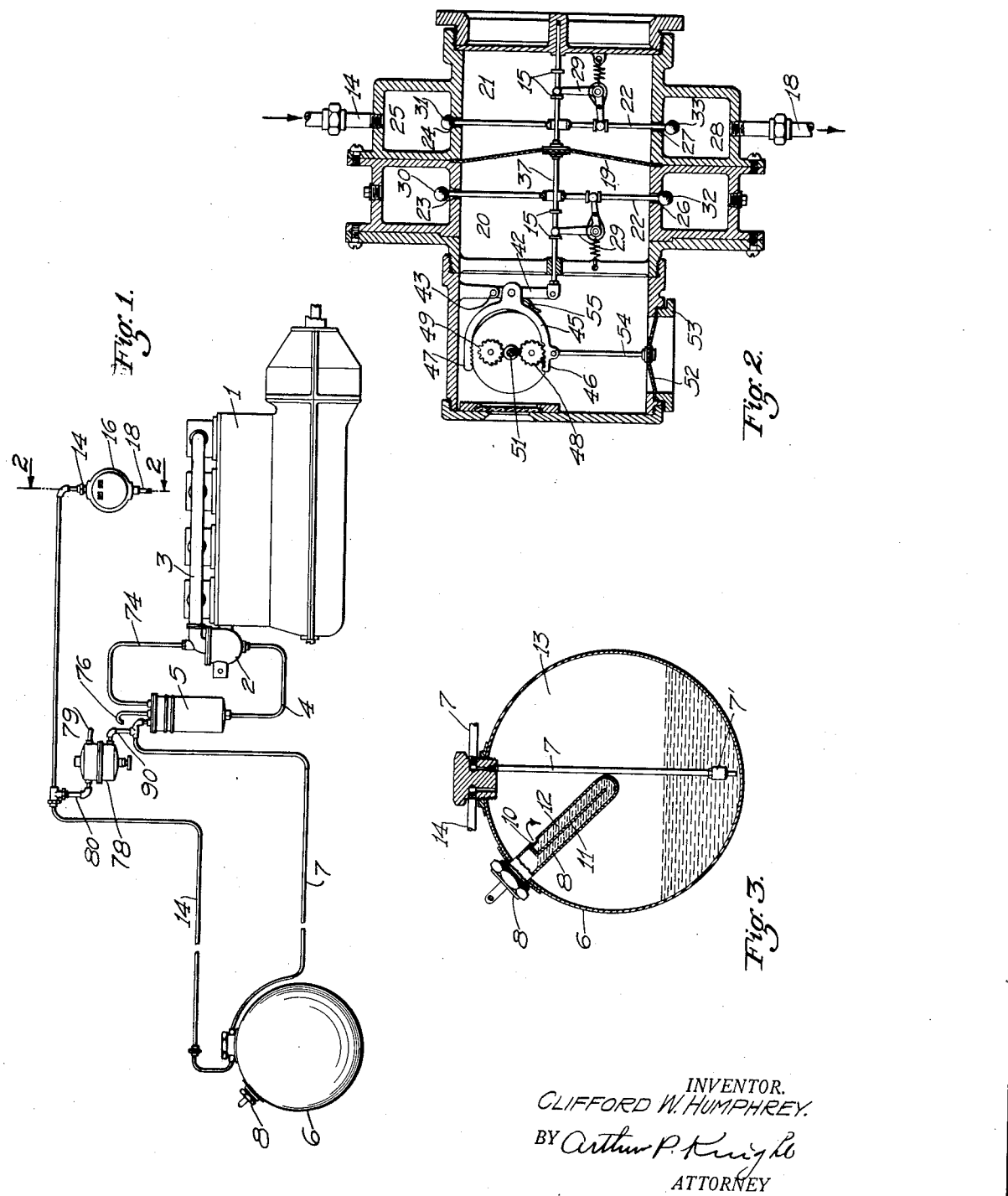
INVENTOR.
CLIFFORD W. HUMPHREY.
BY Arthur P. Knight
ATTORNEY

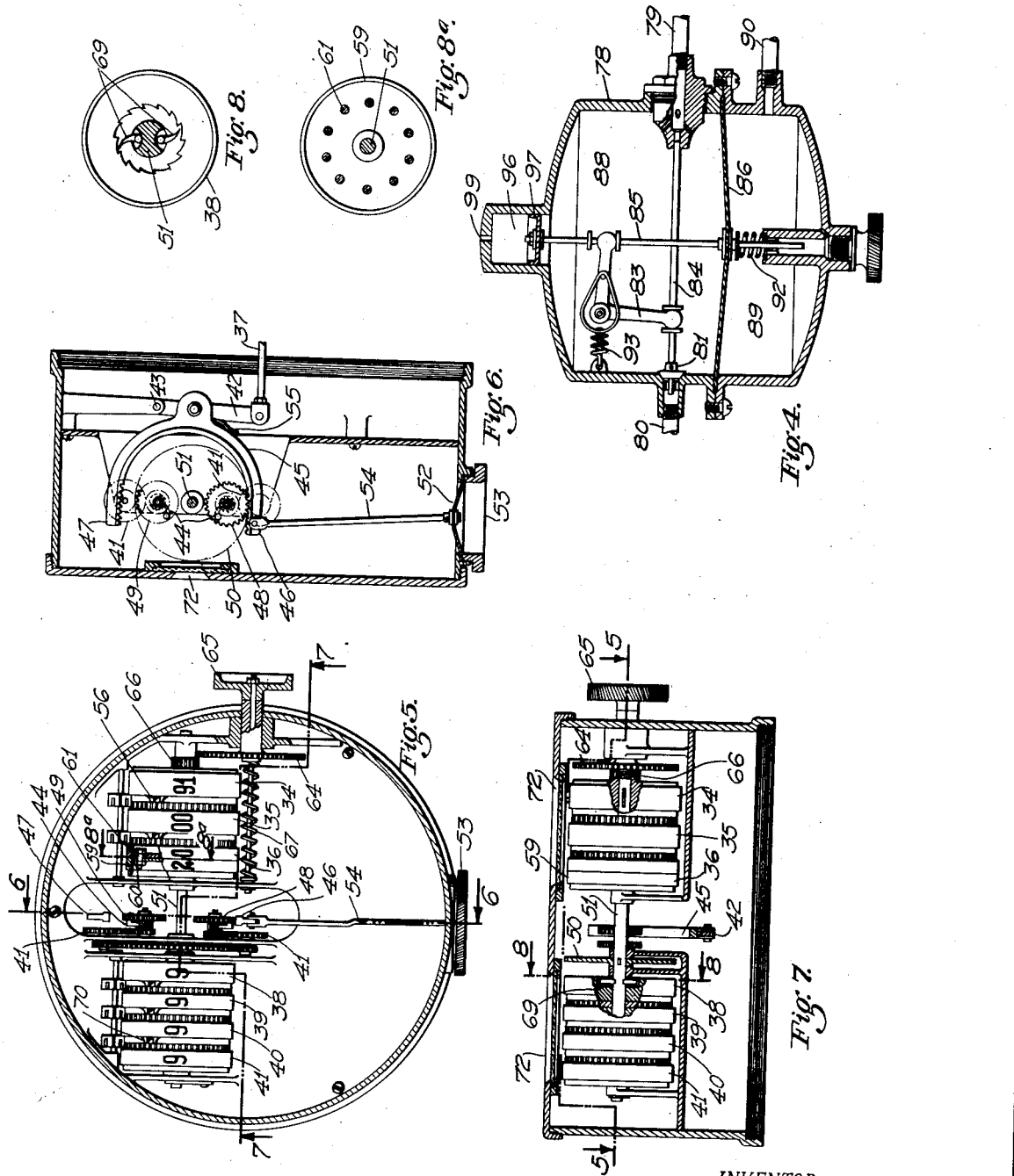

Patented Nov. 14, 1922.

1,435,237

UNITED STATES PATENT OFFICE.

CLIFFORD W. HUMPHREY, OF LOS ANGELES, CALIFORNIA.

FUEL METER FOR INTERNAL-COMBUSTION ENGINES.

Application filed February 3, 1920. Serial No. 356,046.

*To all whom it may concern:*

Be it known that I, CLIFFORD W. HUMPHREY, a citizen of the United States, residing at Los Angeles, in the county of Los Angeles and State of California, have invented a new and useful Fuel Meter for Internal-Combustion Engines, of which the following is a specification.

This invention relates to means for measuring and indicating the fuel supply of an internal combustion engine, and is particularly intended for use in motor vehicles.

An important object of the present invention is to provide means for accurately indicating the amount of gasoline or fuel consumed in the operation of the vehicle.

Another object of the invention is to provide means for measuring or indicating the amount of gasoline or fuel supplied to the fuel tank of the vehicle.

A further object of the invention is to provide measuring or indicating means which will inform the operator as to the amount of fuel used during a run and the amount of fuel remaining in the fuel tank.

The accompanying drawings illustrate embodiments of my invention, and referring thereto:

Fig. 1 is a diagrammatic elevation of an engine and its fuel supply connections showing the application of my measuring device thereto, the fuel supply means being of the vacuum type;

Fig. 2 is a vertical section of the gasmeter on line 2—2 in Fig. 1;

Fig. 3 is a vertical section of the fuel tank;

Fig. 4 is a vertical section of an auxiliary valve device used in connection with the measuring means;

Fig. 5 is a section of the counter for the measuring means, on line 5—5 in Fig. 7;

Fig. 6 is a horizontal section of the operating means for said counter on line 6—6 in Fig. 5;

Fig. 7 is a section on line 7—7 in Fig. 5;

Fig. 8 is a detail elevation of a pawl and ratchet connection for the totalizing counter mechanism;

Figure 9:
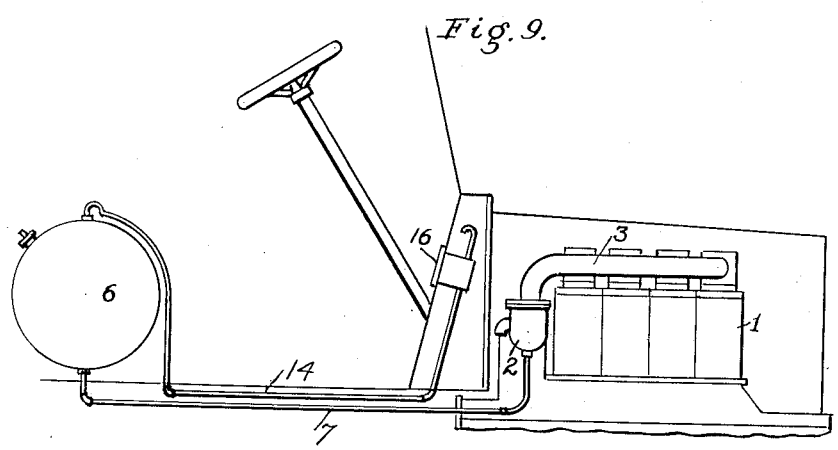

Fig. 8ª is a side elevation of a special dial used in the counter;

Fig. 9 is a side elevation of a gravity feed system for a motor vehicle showing the application of my invention thereto.

In Fig. 1 I have illustrated my invention as applied in connection with what is known as the "vacuum system" of fuel supply for motor vehicle engines wherein the fuel is raised from a fuel tank to a vacuum tank by means of suction communicated to the vacuum tank from the manifold of the engine and is then delivered from the vacuum tank to the carbureter of the engine by gravity. Such "vacuum system" of fuel feed has certain well known advantages in operation in regard to certainty of regularity of feed independent of the fuel tank, and other conditions, and it also is especially advantageous in connection with the present invention as it tends to secure certainty and uniformity of operation of the measuring device hereinafter described.

Referring to Fig. 1 the automobile engine indicated at 1 is shown as provided with a carbureter 2 connected to the manifold of the engine and having a fuel supply connection 4 to the vacuum tank or feed device 5, said carbureter and vacuum feed device being of any usual or suitable construction. Said vacuum tank or feed device 5 may be of the construction described in Patent to W. Jay—No. 1,125,549—dated January 19th, 1915.

The fuel tank 6 is provided with fuel connection 7 preferably having a check valve 7' and leading to the vacuum feed device 5 and with a filling device 8, said filling device being of such construction as to form a seal or trap for the fuel tank. For this purpose, said filling device may consist of a tube extending downwardly into the tank 6 and having a removable end and an outlet 10 on one side, the bottom of said tube 8 being closed and a partition 11 extending downwardly into the tube from a point above the outlet tank to nearly the bottom of the tube, so as to entrap a body of oil or liquid fuel 12 forming a seal or trap. The fuel outlet pipe 7 leads from near the bottom of the tank 6 upwardly through the top of the tank 6 so that the bottom of the tube 7 is always submerged in the liquid fuel forming a trap or seal between said pipe and the air or gas space 13 in the upper part of the tank 6. An air supply pipe 14 communicates with the upper part of the tank 6 so that in filling the tank 6 the air or gas within the space 13 will pass outwardly through the pipe 14 and conversely when fuel is being withdrawn from the tank air or gas will pass inwardly through the pipe 14 into the tank 6 to replace the fuel drawn out. The amount of air or gas passing through the pipe 14 in this manner therefore corresponds to the amount of liquid fuel withdrawn from or passed into the fuel tank and in order to measure the amount of fuel supplied or consumed I provide means for measuring the amount of air or gas passing into or out of the tank. For this purpose, the air or gas pipe 14 is connected to a meter 16 of any suitable construction, for example, such as shown in Figs. 1 and 2, said meter having an air inlet or vent 18 communicating with the outer air, and being adapted to be operated by the stream of air or gas passing therethrough in one direction or the other as the tank is being filled or emptied. The meter illustrated comprising a casing 16 in which is mounted a diaphragm 19 extending between the two chambers 20 and 21 within the casing, said chambers communicating through ports 23 and 24 with what may be an air or gas inlet chamber 25 and through ports 26 and 27 with an outlet chamber 28; the inlet chamber 25 communicating with the air inlet pipe 18 and the outlet chamber 28 communicating with the air or gas pipe 14, it being understood that the terms "inlet" and "outlet," as applied to these chambers, are appropriate to the operation of the apparatus when air is being drawn through the meter from the outer air, as hereinafter explained. The ports 23 and 26 are controlled by two valves 30 and 32 connected to a rod 22, which is in pivotal connection with a bell-crank lever 29, which is operated by projections 15 on a rod 37 connected to the diaphragm 19 and the ports 24 and 27 are controlled by valves 31 and 33 connected to another rod 22 operated in similar manner by a bell-crank lever 29 operated by other projections 15 on the said rod 37, so that motion of the diaphragm in either direction will control the valves in well known manner to reverse the gas connections and cause movement of the valves in an opposite direction in the manner usual in meter devices of this kind. It will be understood, however, that any other gas meter construction may be used in the place of that herein shown and described.

A suitable counter of any desirable construction is connected to be operated by the movement of the diaphragm 19, said counter comprising, for example, a series of dials 34, 35 and 36 constituting a means for registering and indicating the inflow and outflow of fuel from the fuel reservoir and a series of dials 38, 39, 40 and 41 constituting a registering means for totalizing the outflow over a certain period or mileage, for example, during a certain trip. For this purpose, the dials 34, 35 and 36 are operated by mechanism connected to the diaphragm 19 in such manner that the lowest dial 34 is operated step by step in either direction, according to the flow of gas through the meter, and the lowest dial 38 of the other series is operated step by step in one direction only corresponding to the outflow of fuel from the fuel tank. The operating mechanism for the series of dials 34, etc., is shown as comprising a lever 42, pivoted at 43 and connected to the rod 37, which is in connection with the diaphragm 19 and a forked member 45 pivoted to said lever 42, and having two arms 46 and 47 formed as racks for engaging respectively with pinions 48 and 49 forming part of trains of gears 41 and 41' operating through pawl and ratchet means 44 to drive a gear wheel 50 on a shaft 51, which extends axially through all of the counter dials aforesaid. A spring 55 engages member 45 to normally hold rack 46 in mesh with pinion 48. In order to reverse the movement of this operating mechanism when the gas is passing in the opposite direction through the meter, a reversing means is provided consisting, for example, of a diaphragm 52 extending across an opening 53 in the wall of the meter casing and connected by a rod 54 to the member 45 so that when a condition of pressure exists within the casing due to compression of the air in the meter when the tank is being filled the diaphragm 52 will move outwardly causing the rack arm 47 to engage with the pinion 49. In the intermittent reciprocating movement of the rod 37 by the operation of the diaphragm 19 the member 45 is reciprocated in such manner as to cause the shaft 51 to be turned by engagement of one or the other of the rack arms 46 or 47, as the case may be, with the corresponding pinion 48 or 49. The oscillating movement thus imparted to the pinion resulting in a continuous forward movement of the shaft 51 in one direction or the other by operation of the pawl means 44. The dials 34, 35 and 36 are assumed to correspond to tenths, units and tens of gallons, respectively, dial 34 being keyed to shaft 51 by means 51' and suitable carrying or connecting devices, indicated at 56 being provided for causing each dial 34 and 35 at completion of one revolution thereof to operate the dial of next higher denomination, this connecting means being of any well known construction for operating the dials in this manner in either direction. To enable the tens dial to be set to the capacity of the fuel tank for any particular vehicle the same is preferably formed in two parts 36 and 59 and connected by pin 60 extending through holes 61 and 61' in said parts, dial 36 having one hole 61 and dial 59 having ten holes spaced equidistantly, each of these parts having numerals from zero to 9, inclusive; each of the lower dials 34 and 35 is also provided with two numerals which are complementary so that the sum of the two numerals is equal to one unit of the next higher dial. A re-setting means is provided for the dials 34, 35 and 36 consisting, for example, of a gear wheel 64 operated by a thumb nut 65 so as to be brought into engagement with the pinion 66 by pushing the thumb nut inwardly against the action of the spring 67 and then by turning the thumb nut the pinion 66 may be operated to re-set the dials 34, 35 and 36.

The dials 38, 39, etc., of the totalizing counter are connected to the shaft 51 through pawl means 69, shown in Fig. 8, so that only motion of the shaft 51 in one direction corresponding to outflow of fuel from the fuel tank is registered and indicated on these dials; said dials 38, 39, etc., are also provided with carrying means 70 whereby each dial is operated from the next lower dial on completion of one revolution of the latter. The casing of the meter has the usual apertures 72 through which the several dials aforesaid may be inspected, each aperture being provided with a glass pane to seal the same and enable a condition of vacuum or of pressure to be maintained within the casing. The totalizer has any suitable means for resetting.

As above stated, my invention is preferably applied in connection with vacuum system of fuel feed, as illustrated in Fig. 1. The vacuum tube or pipe 74 extends from the manifold 3 to the top of the vacuum tank 5 in the usual manner for vacuum control feed. 76 indicates the usual air inlet for the vacuum tank. All of the aforesaid parts are or may be of the usual construction now in common use in the vacuum system of fuel supply for motor vehicle engines. In the operation of such vacuum system there is produced in the upper part of the vacuum tank 5 in the regular operation thereof a condition of partial vacuum by reason of suction through the pipe 74 from the manifold 3, so as to draw liquid fuel from the tank 6 to the tank 5 and when a certain amount of fuel is thus accumulated in the tank 5 connections are automatically established in the usual manner to admit air to the tank 5 through the air inlet 76 and allow the fuel to pass to the carbureter from the vacuum tank by the action of gravity. In the operation of the vacuum system, as above described, the condition of partial vacuum in the vacuum tank and in the line leading from the fuel tank thereto is intermittent, being produced at a time when the air inlet 76 is closed, such periods of partial vacuum alternating with periods or intervals in which substantially atmospheric pressure is produced in the vacuum tank by opening of the air inlet 76 in the usual manner.

In applying my invention to a vacuum feed system such as above described, it is desirable to provide means for establishing communication between the fuel tank and the outer air, independently of the gas meter, at times thereby eliminating inaccuracies due to changes in volume of the gas content of the tank with variations in temperature and pressure when the air inlet of the vacuum tank is open. For this purpose, a cut-out valve, such as shown in Figs. 1 and 4, may be provided comprising a valve casing 78 having an air inlet 79 establishing permanent communication between the outer air and a chamber 88 within the casing 78 and an outlet pipe 80 communicating with the pipe 14, which leads from the fuel tank to the meter 16. A valve 81 removably mounted in the casing 78 controls communication from the interior of said casing to said pipe 80, said valve being operated by a bell-crank lever 83 having one arm engaging the stem 84 of said valve and the other arm engaged by the rod 85 connected to a diaphragm 86 extending between the space or chamber 88 within the casing 78, which is at atmospheric pressure, and a chamber 89, which is connected by a pipe 90 with the upper part of the fuel tank, or with a portion of the pipe 7 adjacent thereto, as shown, so that when a condition of partial vacuum exists in the upper part of the vacuum tank, said condition of partial vacuum will be communicated to the chamber 89 and the diaphragm 86 will thereby be forced downwardly by the pressure of the air in the chamber 88 in such manner as to operate the lever 83 to close or shut off communication from the chamber 88 to the pipe 80. A spring 92 may be provided for raising the diaphragm 86 to normal position when the atmospheric pressure is reduced in the fuel tank and in the chamber 89 communicating therewith. In order to ensure complete operation of this valve in either direction a tension spring 93 may be provided connected to lever 83 so as to pass dead center in either direction of movement and hold the valve means at either position, and in order to retard or regulate the operation of the valve a dash-pot may be provided therefor comprising a dash-pot chamber 96 in which operates a piston 97 connected to the operating rod 85, said dash-pot cylinder being provided with constricted opening 99, so that air may pass gradually between the interior of the dash-pot cylinder 96 and the outer air.

The operation of the apparatus is as follows:

Assuming that the vacuum tank is in operation, and that fuel is therefore being drawn from the fuel tank 6 to the vacuum tank 5, the cut-out valve 81 will be in the position shown in Fig. 4 shutting off the air supply through the auxiliary air inlet pipe 80 and the reversing means for the meter is held in the position shown in Fig. 2 by spring 55. As soon as the vacuum tank begins to draw liquid fuel from the tank 6 air begins to flow in through the inlet pipe 18 and through the meter and then through pipe 14 to the fuel tank, and the air so passing through the meter operates the diaphragm 19 in such manner as to reciprocate the rod 37 and fork 45 causing operation of the pinion 48 and through pawl 44, and the train of gears connected thereto of the shaft 51, thereby causing advance of the unit dial of the charge meter step by step and also operating the unit dial 38 of the totalizing meter, step by step. When the unit dial completes one revolution it will operate the next higher dial one step, and so on up. The numbers at the right of the dial of the charge meter are arranged in such manner that in this operation successively higher numbers will be presented, indicating withdrawal of fuel from the tank, so that the operator by inspection of the right hand numbers of these dials of the meter will be advised of the total amount of oil withdrawn from the tank, it being understood that these dials will be set to zero when the tank is filled, or when starting on a trip. The left hand numbers, which may be of different color and appearance from the right hand numbers for facility in reading, run in reverse order to the right hand numbers and, therefore, indicate the amount to which the tank is filled in the filling operation hereinafter described, and the operator will set the left hand section of the dial 36 so that the numeral thereon, which is opposite the zero on the right hand section of said dial, corresponds to the capacity of the tank of his vehicle in tens of gallons, for example, so that when the figure on the right hand section of the dial is zero, indicating that nothing has been withdrawn, the figure on the left hand section of the dial will correspond to the full capacity of the tank.

At each operation of the vacuum tank as the vacuum tank becomes full and cuts off the vacuum connection from the manifold and at the same time opens the air inlet 76, the condition of suction in chamber 89 is relieved and diaphragm 86 immediately opens the valve 81 admitting air through the auxiliary air pipe 80 of the pipe 14, thus cutting the meter 16 out of operation until the vacuum tank has delivered its content of fuel to the carbureter as set forth in the patent to W. Jay aforesaid. An automatic float valve means then operates therein to restore communication with the manifold and cut off communication with the outside air, so as to restore the condition of partial vacuum in the vacuum tank and cause a further quantity of fuel to be drawn from the fuel tank into the vacuum tank, this further quantity being registered by the meter 16 in addition to that previously registered. By thus establishing communication between the fuel tank and the outside air independently of the meter at times when the vacuum system is not drawing fuel from the tank, the pneumatic pressure within the fuel tank is allowed to equalize or come to equilibrium with the barometric pressure of the outside air and inaccuracies of metering due to variations in barometric pressure or in temperature are thereby avoided. If such equalizing means were not provided, then any change of pressure of the gaseous medium within the fuel tank due to variations in temperature, or any relative pressure between the said gaseous medium within the tank and the outside air due to changes of barometric pressure, would tend to cause flow of gas through the meter, giving an erroneous registration on the meter, but by permitting the barometric conditions to equalize between the tank and the outside air at every period intervening between the successive operations of the fuel tank this error is avoided as the amount of gaseous medium passing through the registering meter is equal to the amount of fuel withdrawn from the fuel tank. The device continues to operate as above described in successive operations of the vacuum tank so that the driver of the vehicle is constantly advised by inspection of the meter of the amount of fuel withdrawn from the tank and of the amount of fuel remaining in the tank, and he is also advised by inspection of the totalizing registering dials 38, 39, etc., of the total amount of fuel used, say on a given trip. When the vacuum tank inlet 9 is operated as above described, the check valve 7' prevents backflow of fuel to the fuel tank, so as to avoid liability of over registration due to fuel passing out and then passing back without moving the meter back.

When the tank is being filled through the filling means 8 a condition of pressure is produced in the fuel tank causing air or gas to flow through the pipe 14 and the meter 16, this condition of pressure being communicated to the chamber to which the diaphragm 52 is exposed so as to move said diaphragm outwardly and reverses the operating mechanism for the meter, so that the shaft 51 will be moved in the opposite direction. This causes the dials 34, 35 and 36 to move in such manner as to show how many gallons of fuel are charged into the fuel tank, so that the totalizing register shows only the amount of fuel withdrawn from the tank and this register accumulates the amounts withdrawn after successive filling operations.

In applying my invention to a gravity feed system the arrangement illustrated in Fig. 9 may be used, the fuel tank 6 being connected directly to the carbureter of the engine by the pipe 7 and the upper part of the tank being connected directly to the registering meter 16 by the pipe 14. The construction and operation is otherwise the same as above described, except that the registering meter is always in effective communication with the air space in the fuel tank and registers directly the amount of gaseous medium flowing to or from the tank in discharging or charging thereof. This arrangement is sufficiently accurate for many purposes, particularly where the variations of temperature and barometric pressure during a trip are inconsiderable.

What I claim is:

1. In combination with a tank for liquid fuel, means for registering the amount of liquid supplied to and withdrawn from said tank, comprising a pneumatically operated metering device having a pneumatic connection with the tank and with the outer air and adapted to be operated by flow of gaseous medium between the tank and the outer air in filling and discharge of the tank, each operation of said registering means corresponding to a definite amount of gaseous medium passing through said metering device, and said registering means connected to be operated step by step by the operation of said pneumatically operated metering mechanism, and to be operated in one direction while the tank is being filled and in the opposite direction while the tank is being discharged.

2. In combination with a fuel tank, a pneumatically operated metering device having pneumatic connection with the said tank and with the outer air and adapted to be operated by passage of gaseous medium therethrough from the tank to the outer air, or vice versa, in filling or emptying of the tank, a registering means connected for operation by said pneumatic metering device, and means responsive to the pressure in the fuel tank and controlling the connection of said registering means with said pneumatically operated metering mechanism to effect operation of said registering means in one direction when the fuel tank is being filled and in the opposite direction when the fuel tank is being emptied.

3. An apparatus, as set forth in claim 2, comprising, in addition, a totalizing register and means connected to the first named register for operating the totalizing means successively in one direction only during the operation of the first named meter by the passage of gaseous medium to the tank due to withdrawal of fuel therefrom.

4. In combination with a fuel tank, a pneumatically operated metering device having pneumatic connection with the said tank and with the outer air and adapted to be operated by passage of gaseous medium therethrough from the tank to the outer air, or vice versa, in filling or emptying of the tank, a registering means connected for operation by said pneumatic metering device, and means responsive to the pressure in the fuel tank and controlling the connection of said registering means with said pneumatically operated metering mechanism to effect operation of said registering means in one direction when the fuel tank is being filled and in the opposite direction when the fuel tank is being emptied, said registering means having two sets of reversely numbered counter devices for reading in opposite directions of movement thereof.

5. In combination with a fuel tank, a pneumatically operated registering meter having connections to the outer air and to the fuel tank to be operated by flow of gaseous medium between the tank and the outer air in filling and discharge of the tank, and means for intermittently arresting delivery of fuel from the fuel tank and placing the fuel tank in communication with the outer air independently of the registering meter to equalize the pressure in the tank with that of the outer air.

6. In combination with a fuel tank and a vacuum fuel feed system for supplying fuel from said tank to an internal combustion engine, said system including means in which a condition of partial vacuum is produced at each operation of the system to draw fuel from the tank intermittently, a pneumatically operated registering meter having pneumatic connections with the fuel tank and with the outer air, and adapted to be operated by flow of gaseous medium through the meter from the tank to the outer air, and vice versa, and means controlled by the operation of the vacuum fuel feed system to prevent operation of the registering meter, except when the vacuum system is withdrawing fuel from the fuel tank, or when the fuel tank is being filled.

7. In combination with a fuel tank and a vacuum fuel feed system for supplying fuel from said tank to an internal combustion engine, said system including means in which a condition of partial vacuum is produced at each operation of the system to draw fuel from the tank intermittently, a pneumatically operated registering meter having pneumatic connections with the fuel tank and with the outer air, and adapted to be operated by flow of gaseous medium through the meter from the tank to the outer air, and vice versa, a cut-out valve controlled by the operation of the vacuum fuel feed system to establish communication from the fuel tank to the outer air independently of said registering meter to prevent operation of the registering meter, by reason of thermal or barometric variations.

In testimony whereof I have hereunto subscribed my name this 28th day of January, 1920.

CLIFFORD W. HUMPHREY.